(12) United States Patent
Seitz

(10) Patent No.: US 7,186,072 B2
(45) Date of Patent: Mar. 6, 2007

(54) RECIRCULATION STRUCTURE FOR A TURBOCOMPRESSOR

(75) Inventor: Peter Seitz, Guending/Bergkirchen (DE)

(73) Assignee: MTU Aero Engines GmbH, Munich (DE)

( * ) Notice: Subject to any disclaimer, the term of this patent is extended or adjusted under 35 U.S.C. 154(b) by 32 days.

(21) Appl. No.: 10/471,859

(22) PCT Filed: Aug. 21, 2003

(86) PCT No.: PCT/EP03/09265

§ 371 (c)(1),
(2), (4) Date: Sep. 14, 2004

(87) PCT Pub. No.: WO2004/018844

PCT Pub. Date: Mar. 4, 2004

(65) Prior Publication Data

US 2005/0019152 A1    Jan. 27, 2005

(30) Foreign Application Priority Data

Aug. 3, 2002  (DE) ............... 102 38 837
Jul. 3, 2003   (DE) ............... 103 30 084

(51) Int. Cl.
    *F01D 11/08*  (2006.01)
(52) U.S. Cl. ............... 415/57.1; 415/57.4; 415/58.5; 415/58.7
(58) Field of Classification Search ........... 415/58.5, 415/57.1, 57.2, 57.3, 57.4, 58.7, 58.1, 59.1
See application file for complete search history.

(56) References Cited

U.S. PATENT DOCUMENTS

| 4,511,308 A |   | 4/1985  | Russell et al. .......... 415/191 |
|-------------|---|---------|----------------------------------|
| 4,602,410 A | * | 7/1986  | Karlsson et al. ........ 29/889.3 |
| 4,673,331 A |   | 6/1987  | Kolb .................... 415/58.7 |
| 4,871,294 A |   | 10/1989 | Ivanov et al. .......... 415/58.7 |

(Continued)

FOREIGN PATENT DOCUMENTS

DE    3539604 C1    2/1987

(Continued)

OTHER PUBLICATIONS

German Office Action dated Aug. 23, 2004, with English translation.

(Continued)

*Primary Examiner*—Edward K. Look
*Assistant Examiner*—Nathan Wiehe
(74) *Attorney, Agent, or Firm*—Crowell & Moring LLP

(57) ABSTRACT

A recirculation structure for turbo-compressors has an annular chamber that is positioned in the area of the free blade ends of a rotating blade ring and that radially borders the main flow channel, and has a multitude of guide vanes arranged in the annular chamber and distributed around its circumference. The annular chamber enables the passage of air flow in the forward and/or rear areas, and the guide vanes are firmly fixed to at least one wall of the annular chamber and otherwise are designed to be free-standing. The tips of the guide vanes that face the annular chamber extend along and/or near the contour of the main flow channel, and axially overlap the free blade ends or axially border the area of the free blade ends.

2 Claims, 4 Drawing Sheets

U.S. PATENT DOCUMENTS

| | | | | |
|---|---|---|---|---|
| 5,137,419 | A | 8/1992 | Waterman | 415/914 |
| 5,282,718 | A | 2/1994 | Koff et al. | 415/57.3 |
| 5,562,404 | A * | 10/1996 | Koff et al. | 415/57.4 |
| 5,607,284 | A * | 3/1997 | Byrne et al. | 415/58.5 |
| 5,762,470 | A | 6/1998 | Gelmedov et al. | |
| 6,302,640 | B1 | 10/2001 | McKelvey | 415/58.5 |
| 6,935,833 | B2 * | 8/2005 | Seitz | 415/58.1 |

FOREIGN PATENT DOCUMENTS

| | | |
|---|---|---|
| DE | 3322295 C3 | 9/1990 |
| DE | 10105456 A1 | 8/2002 |
| EP | 0122892 A1 | 10/1984 |
| WO | WO 95/18922 | 7/1995 |
| WO | WO 03/072910 | 9/2003 |
| WO | WO 03/072949 | 9/2003 |

OTHER PUBLICATIONS

English translation of previously filed German Office Action date Mar. 3, 2004.

English translation and copy of previously filed German Office Action dated Feb. 20, 2003.

German office action dated Mar. 3, 2004.

* cited by examiner

RECIRCULATION STRUCTURE FOR A TURBOCOMPRESSOR

BACKGROUND AND SUMMARY OF THE INVENTION

This invention relates to a recirculation structure for turbo-compressors, a turbo-compressor, an aircraft engine, and a stationary gas turbine.

Recirculation structures for turbo-compressors have been known in the art for quite a long time, and in the trade are generally referred to as "casing treatments". Their primary function is to increase the aerodynamically stable operating range of the compressor, wherein the so-called surge margin is shifted to higher compressor pressures, i.e. to a higher compressor load. The failures that are responsible for localized stalling and ultimately for the surging of the compressor occur on the casing side at the ends of the rotating blades of one or more compressor stages, and on the hub side at the ends of the vanes that lie radially inside, because in these areas the aerodynamic load is the highest. By recirculating the "air particles" that circulate between the blade tips at blade speed, and whose energy level is reduced, into the main stream with an increase in energy, the flow in the area of the blade ends is again stabilized. Because flow disruptions as a rule do not occur evenly over all the stages, in terms of fluid mechanics, a circumferential balancing, in addition to the essentially axial recirculation, should also be possible. The primary disadvantage of known "casing treatments" is that, although they do increase the surge margin, they also reduce the efficiency level of the compressor.

German publication DE 33 22 295 C3 protects an axial fan with a "casing treatment". Recognizable therein is an annular chamber (8) in which guide vanes (9) are fixed. In the downstream area over the ends of the rotating blades is an area that is open circumferentially into which the guide vanes do not extend. Characteristic of this type of "casing treatment" is a closed ring (7) that is aligned generally with the shape of the main flow channel, with the ring separating the rear intake area from the forward outlet area of the recirculation structure, and forming a smooth, closed surface area.

A quite similar "casing treatment" is known from German publication DE 35 39 604 C1, wherein an area that is open circumferentially is present in the forward and rear areas of the annular chamber (7). The radially inside ring 6 is also seen here.

A more recent "casing treatment" is known from U.S. Pat. No. 5,282,718. Here, the annular chamber (18, 28) and the guide vanes (24) are improved in terms of fluid mechanics. Here again, the intake and outlet of the recirculation flow are separated by a solid ring that is smooth and closed on the side of the blades. Rings of this type in the blade area must ordinarily be provided with a contact or intake coating in case they should come in contact with the blade tips.

Further "casing treatments" having axial or axially angled grooves are disclosed e.g. in U.S. Pat. No. 5,137,419. These are not taken into consideration here, however, because the grooves are not connected to one another in these versions; hence no circumferential flow comparison is possible.

U.S. Pat. No. 4,511,308 relates to ventilators (fans, blowers) having various "casing treatment" designs. The simplest design according to FIG. 6 possesses only one annular chamber without guide vanes. In the embodiments according to FIGS. 1 and 3, guide vanes are mounted in the annular chamber, and the upstream casing wall (22) is extended beyond the radial inside edges of the guide vanes (21) like a cylindrical or conical socket piece, so that on the upstream, forward end of the annular chamber no outlet of the recirculation flow into the main flow is possible. FIG. 5 shows guide vanes (21) that are mounted on the forward end wall and on the outer circumference of the annular chamber, and are further designed to be freestanding. Here there is no socket- or ring-like element that connects or covers the guide vanes circumferentially. The free, radially inside edges of the guide vanes (21) rise from the front to the back from the diameter of the intake casing (15) up to the greatest diameter of the annular chamber (16). In this manner, although in the downstream area the guide vanes axially overlap the upstream area of the blade ends (14), due to the great radial distance between the guide vanes (21) and the blade ends (14), no effective and defined guidance of the recirculation air is possible. Of further disadvantage is the large volume of the annular chamber (16) in relation to the blade dimensions. This type of embodiment is neither aerodynamically nor constructively suitable for a turbo-compressor.

In view of the disadvantages of the state of the art solutions, the object of the invention is to provide a recirculation structure for turbo-compressors that will enable a substantial enhancement of the surge margin, and thus a clear expansion of the stable operating range, without a significant reduction of the efficiency of the compressor.

The essence of the invention is to have the tips of the guide vanes that face the annular chamber lie on or near the contour of the main flow channel, and axially overlap the free ends of the blades or axially border the area of the free ends of the blades. In this manner, annular elements with contact coatings, etc. can be eliminated. The above-cited patent specifications show that up to now the professional world has consistently tried to design recirculation structures that will be smooth, without gaps, and closed over the largest possible axial range, up to the main flow channel, i.e. up to the so-called annular chamber, in order to effect an extension of the contours of the main flow channel that will be as favorable in terms of flow and loss as possible. The invention, in contrast, leads to gaps, fissured surfaces, etc., and thus would appear to be disadvantageous and inexpedient. Test have shown, however, that the recirculation structure of the invention is superior to known solutions in terms of both enhancing the surge margin and improving the level of efficiency. This can be explained in aerodynamic terms in that the free, informal design of the recirculation flow in the open annular chamber with free-standing guide vanes and circumferential flow links is more important than the greatest possible gap-free extension of the contour of the main flow channel. The absence of a closed ring has the further advantages that no contact or intake coating of the guide vanes is necessary, and radial space and weight are saved, resulting in structural mechanical advantages. However, a defined control of the recirculation flow—without annular elements—is achieved only if the free edges of the guide vanes run relatively close to the edges of the blades, partially overlapping them axially, or at least lying adjacent to their space. Only in this way can a compact "casing treatment" that is suitable for use in a compressor ultimately be achieved.

The ratio of the axial length of the annular chamber to the axial length of the blade ends preferably is 0.2 to 1.5. In the case of wide blades having a large axial span at the blade end, the ratio will be closer to 0.2; with narrow blades having a small axial span at the blade end, the ratio will be closer to 1.5.

In the preferred embodiment, the ratio of the radial height to the axial length of the annular chamber is 0.1 to 1.0. With aircraft engines having very strict standards in terms of space requirements, contours, etc., attempts will be made to manage with a smaller ratio, i.e. a smaller radial height. For stationary applications having adequate space available it is possible to go closer to the upper limit. With axially short annular chambers one would also tend more to approach the upper limit.

It is further preferred that the tips of the guide vanes that face toward the annular chamber are radially recessed, at least in the area of the free blade ends, far enough that during normal operation the ends of the blades will not come into contact with the guide vanes. This is due to the fact that the tips of the blades may be damaged by brushing against something, especially against hard, inflexible guide vane tips. The recessing of the guide vane tips is not in contradiction to the requirement that the tips should lie on or near the contour of the main flow channel, because the small radial gap dimensions required to prevent contact are practically without consequence in terms of fluid mechanics, i.e. they do not negatively affect recirculation.

Preferred embodiments of the recirculation structure, as well as a turbo-compressor, an aircraft gas turbine, and a stationary gas turbine all form the subject matter of the invention.

BRIEF DESCRIPTION OF THE DRAWINGS

The invention will be described in greater detail with reference to the drawings.

DETAILED DESCRIPTION OF THE INVENTION

Figure 1:
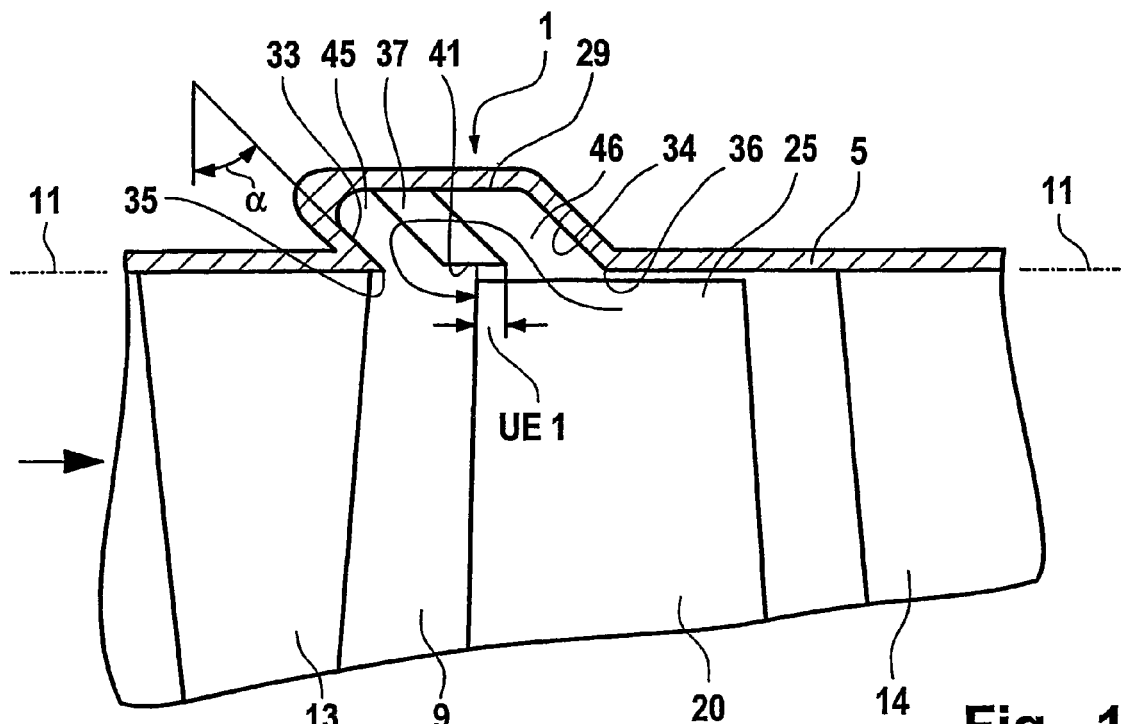
FIG. 1 shows a partial longitudinal section of a compressor in an axial construction, in the area of a recirculation structure on the side of the casing.

The recirculation structure 1 according to FIG. 1 is integrated into the casing 5 of a turbo-compressor, and thus is to be referred to as a "casing treatment". The direction of flow in the bladed main flow channel 9 is indicated on the left by an arrow, thus it flows from left to right. In the area shown here, the flow first strikes a vane ring 13, then a rotating blade ring 20, and finally another vane ring 14. The radial outer contour 11 of the main flow channel 9 corresponds to the inner contour of the casing 5, and for purposes of clarification is continued here by dotted/dashed lines to the left and right of the actual illustration. The static recirculation structure 1 operates in conjunction with the rotating blade ring 20, and lies for the most part axially in front of said blade ring, i.e. upstream. The annular chamber 29, which together with the guide vanes 37 forms the recirculation structure 1, borders the main flow channel 9 radially from the outside, and is open toward it. The tips 41 of the guide vanes 37 lie on or near the contour 11 of the main flow channel 9, i.e. they are aligned at least nearly with the inner contour of the casing. The guide vanes 37 may be comprised of a metal, such as a Ni-based alloy, or of a light metal, such as Al, or of a plastic, such as thermoplastics, thermosetting plastics, or elastomers. The forward wall 33 and the rear wall 34 of the annular chamber 29 are tilted forward beginning at their radial inner edges 35, 36, in order to make them favorable in terms of recirculation flow, as indicated by a small arrow.

The angle of slope of the forward wall is indicated by α, and may be equal to or different from the angle of the rear wall 34. Between the forward wall 33, the guide vanes 37, and the rear wall 34 are recesses 45, 46, which permit flow processes inside the annular chamber in a circumferential direction, in addition to the predominantly axial flow of recirculation. The free blade ends of the rotating blade ring 20, in the area of which flow disruptions occur most frequently, are indicated by the number 25. The axial overlapping of the guide vanes 37 and the blade ends 25 is indicated by UE 1.

Figure 2:
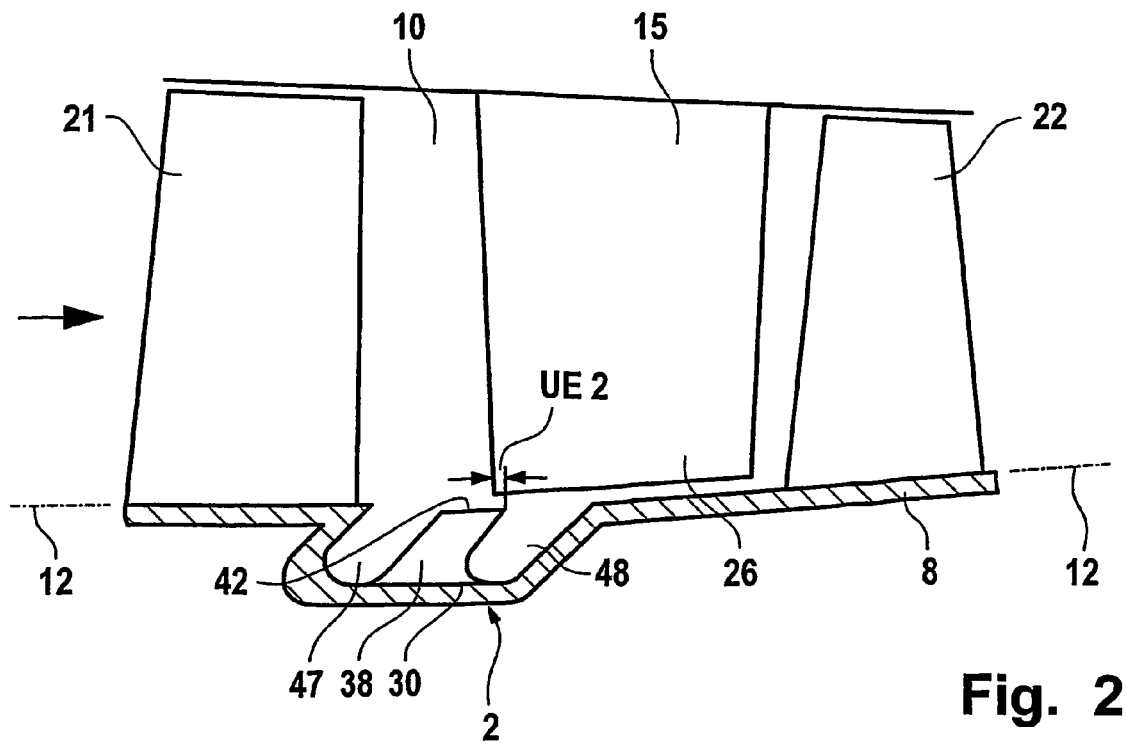
FIG. 2 shows a comparable partial longitudinal section in the area of a recirculation structure on the side of the hub.

In contrast to FIG. 1, FIG. 2 shows a recirculation structure that is integrated into a rotating hub 8. In the main flow channel 10 from left to right are visible a rotating blade ring 21, a vane ring 15 with radial inner, free blade ends 26, and a rotating blade ring 22. Such a new design for a recirculation structure would consequently be referred to as a "hub treatment". The recirculation structure 2 comprised of an annular chamber 30 and guide vanes 38, with forward and rear recesses 47, 48 between the forward and rear walls of the annular chamber 30 and the guide vanes distanced from said walls, operates in conjunction with a vane ring 15 that lies primarily downstream. Because here the "hub treatment" rotates and the vane ring 15 remains stationary, the rotor speed acts entirely as a differential speed. The mode of operation does not differ in principle from that of a "casing treatment". In a turbo-compressor, "casing treatment" and "hub treatment" can even be combined and used in several stages. The radial inner contour 12 of the main flow channel here corresponds to the outer contour of the hub 8. UE 2 is the axial overlapping of the guide vanes 38 with the blade ends 26 of the vane ring 15. The guide vanes 38 are rounded at the crossover to the walls of the annular chamber 30, to increase stability.

Figure 3:
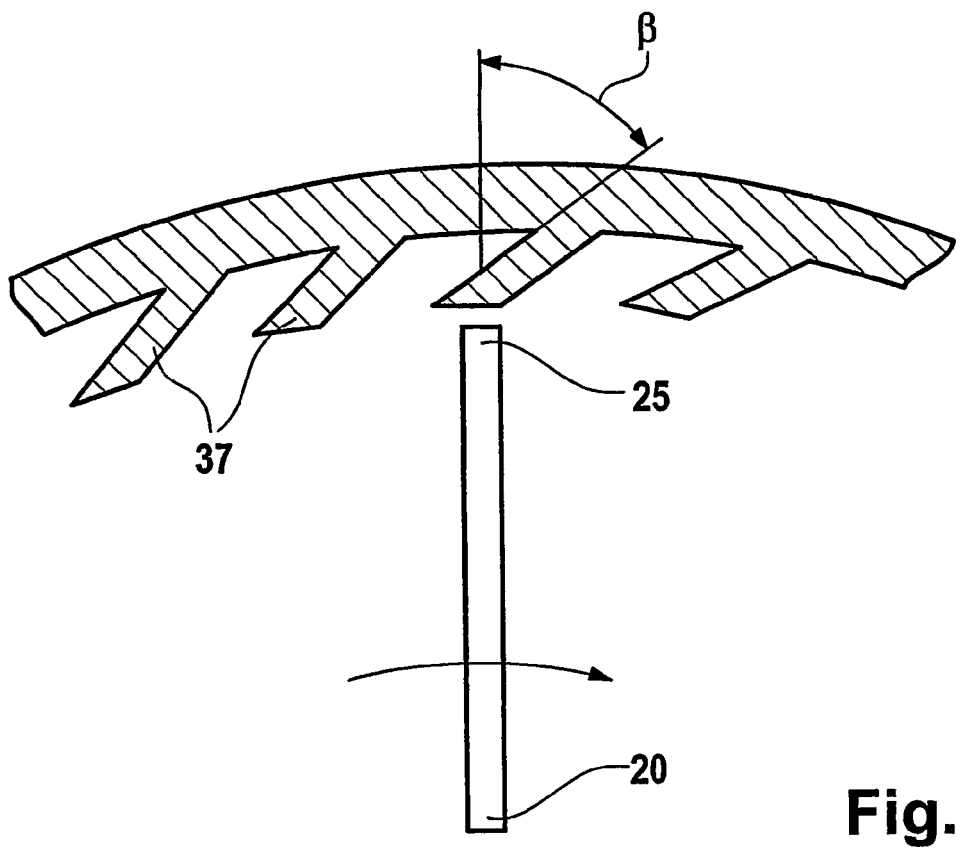
FIG. 3 shows a partial cross-section through the recirculation structure shown in FIG. 1.

FIG. 3 shows a detail from FIG. 1, in cross-section. The guide vanes 37 are tilted radially at an angle β such that the blade ends 25 of the rotating blade ring 20 force the recirculation flow into the annular chamber 29 without heavy losses, taking into account the direction of rotation (see arrow). The angle of slope β can decrease from the radial inside to the outside, to the value "zero", with appropriately curved guide vanes.

A radial arrangement of the guide vanes, i.e. β=0°, is possible, but less favorable in terms of flow.

Figure 4:
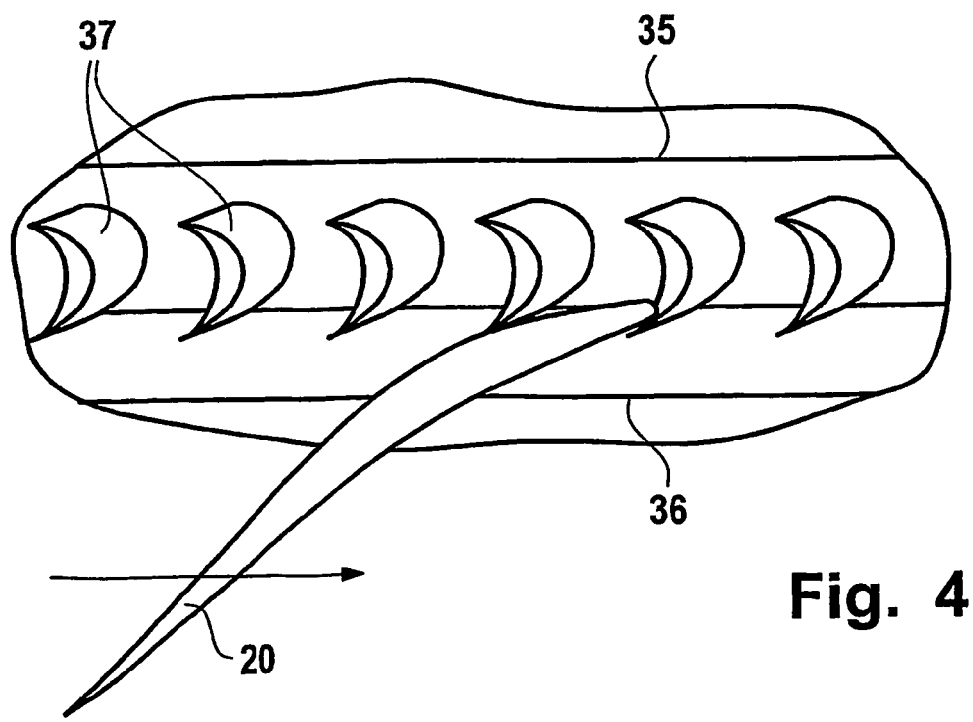
FIG. 4 shows a partial view of the recirculation structure shown in FIGS. 1 and 3, radially from the inside.

The view of FIG. 3 shown in FIG. 4 shows the blade profiling of the rotating blade ring 20 in connection with its direction of rotation (arrow), and provides a clear presentation of the profiling and curvature of the guide vanes 37 that are favorable in terms of flow. An expert in the field would recognize that the recirculation outlet would take place in the area of the upstream edge 35 of the annular chamber 29 in relation to the rotating blade ring 20, here with counter-swirl. The downstream edge of the annular chamber is indicated by the number 36.

Figure 5:
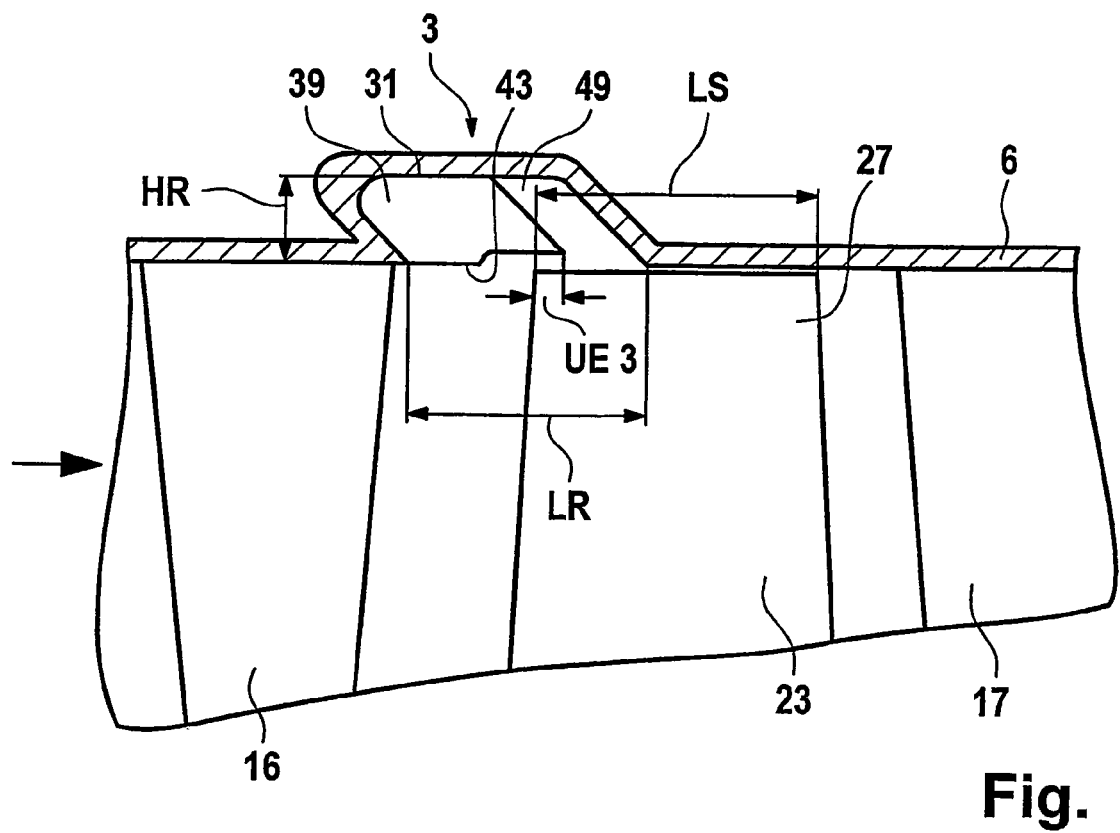
FIG. 5 shows a partial longitudinal section in the area of a recirculation structure on the side of the casing, modified from that shown in FIG. 1.

The recirculation structure 3 shown in FIG. 5 is a "casing treatment" with an annular chamber 31 integrated into a casing 6. The guide vanes 39 here extend up to the forward wall of the annular chamber 31; in the rear area are recesses 49, in the immediate area around the blade ends 27 of the rotating blade ring 23. UE 3 indicates the axial overlapping of the guide vanes 39 with the blade ends 27. LR is the axial length of the annular chamber 31, and HR is its radial height. LS indicates the axial length of the blade ends 27. The ratio of LR to LS should be 0.2 to 1.5; the ratio of HR to LR is 0.1 to 1.0. The tips 43 of the guide vanes 39 here are displaced radially toward the outside in the area of rotation of the blade ends 27, in order to prevent them from coming into contact with one another. The vane rings are indicated by the numbers 16 and 17.

Figure 6:
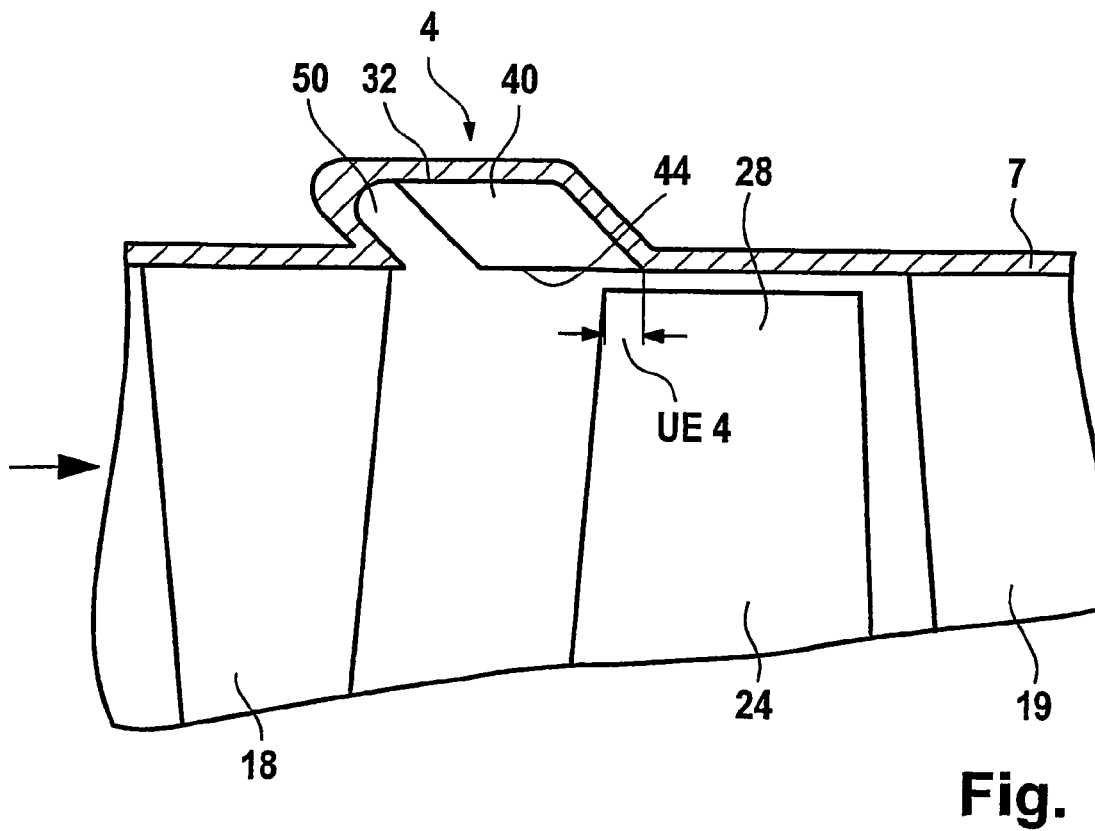
FIG. 6 shows a partial longitudinal section in the area of a recirculation structure on the side of the casing, modified from those shown in FIG. 1 and FIG. 5.

The recirculation structure 4 shown in FIG. 6 with the annular chamber 32 and the guide vanes 40 is also a "casing treatment", which is integrated into a casing 7 and operates in conjunction with a rotating blade ring 24. In contrast to FIG. 5, here the guide vanes 40 extend up to the rear wall of the annular chamber 32. Recesses 50 here are provided in the forward area due to the guide vanes 40 that are distanced from the forward wall of the annular chamber 32. The tips 44 of the guide vanes 40 extend up to the area of rotation of the blade ends 28.

Figure 7:
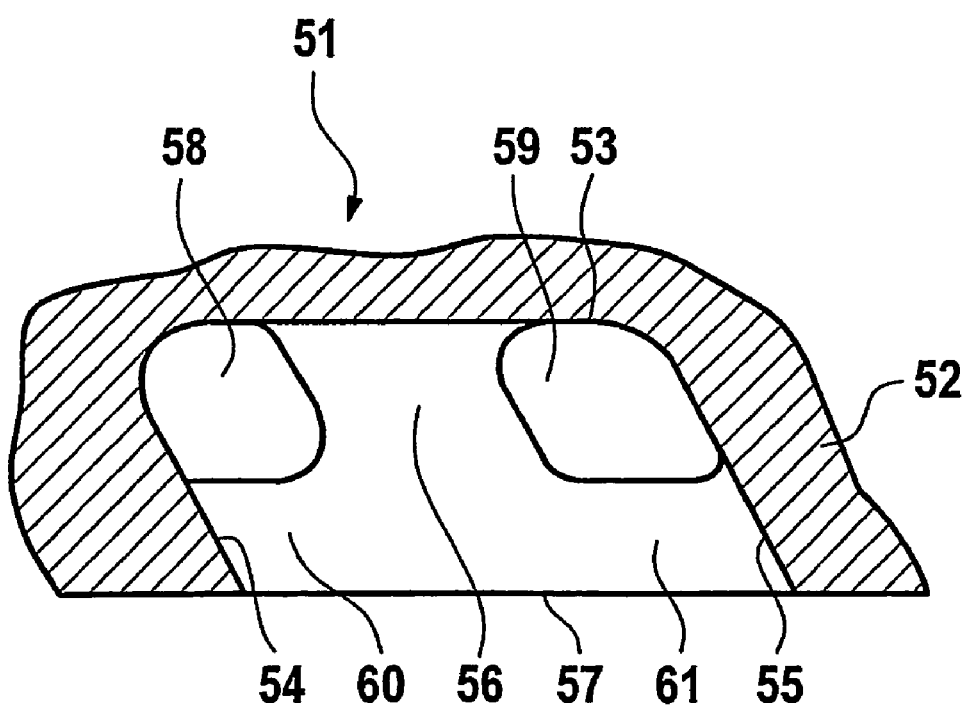
FIG. 7 shows a further partial longitudinal section in the area of another modified recirculation structure on the side of the casing.

The recirculation structure 51 shown in FIG. 7 differs from the previously described embodiments in that for circumferential flow processes in the annular chamber 53, openings 58, 59 that are bordered on all sides are present in the forward and rear areas of the guide vanes 56. There thus remain bridges 60, 61 that increase stability, via which the guide vanes 56 are firmly connected to the forward and rear walls 54, 55 of the annular chamber 53 in the casing 52. Alternatively, an opening 58 or 59 can be replaced by a recess as described above, based upon a distancing of the guide vanes from the wall of the annular chamber 53. It is understood that only one opening 58 or 59 can be provided in the forward or rear area of the guide vanes.

For all embodiments of the recirculation structure, the tips 41 through 44 and 57 of the guide vanes 37 through 40 and 56 need not necessarily be displaced radially toward the outside if the guide vanes are made of a soft light metal or a plastic, as contact with the blade ends 25 through 28 can then be permitted without damage to the blades.

The invention claimed is:

1. A recirculation structure for a turbo-compressor, comprising:
   an annular chamber oriented concentrically with a compressor axis in an area of free blade ends of a rotating blade ring, an axial center of the annular chamber lying in front of an axial center of the free blade ends, said annular chamber radially bordering a contour of a main flow channel, and
   a multitude of guide vanes arranged in the annular chamber and distributed around its circumference,
   wherein the annular chamber permits flow to pass through circumferentially in at least one of forward and rear areas thereof, wherein the guide vanes are connected to at least one wall of the annular chamber and are free-standing,
   wherein tips of the guide vanes face toward the main flow channel, and are at least nearly aligned with the contour of the main flow channel,
   wherein the tips of the guide vanes axially overlap or axially border the area of the free blade ends, and
   wherein the circumferential flow passes through openings in forward areas, in rear areas, or in both forward and rear areas of the guide vanes.

2. A recirculation structure for a turbo-compressor, comprising:
   an annular chamber oriented concentrically with a compressor axis in an area of free blade ends of a rotating blade ring, an axial center of the annular chamber lying in front of an axial center of the free blade ends, said annular chamber radially bordering a contour of a main flow channel, and
   a multitude of guide vanes arranged in the annular chamber and distributed around its circumference,
   wherein the annular chamber permits flow to pass through circumferentially in at least one of forward and rear areas thereof, wherein the guide vanes are connected to at least one wall of the annular chamber and are free-standing,
   wherein tips of the guide vanes face toward the main flow channel, and are at least nearly aligned with the contour of the main flow channel,
   wherein the tips of the guide vanes axially overlap or axially border the area of the free blade ends, and
   wherein the circumferential flow passes through at least one of recesses in the guide vanes and openings in the guide vanes in forward or in forward and rear areas of the annular chamber.

* * * * *